United States Patent [19]

Kellum et al.

[11] 3,835,738

[45] Sept. 17, 1974

[54] INTERNALLY MOUNTING PIPE BEVELING MACHINE

[75] Inventors: Jerome B. Kellum; Bill Smith, both of Ponca City, Okla.

[73] Assignee: Continental Oil Company, Ponca City, Okla.

[22] Filed: Aug. 13, 1973

[21] Appl. No.: 387,779

[52] U.S. Cl. .................................... 82/4 C, 82/1.2
[51] Int. Cl. ............................................. B23b 3/24
[58] Field of Search............ 82/4 C, 4 R, 59, 67, 1.2; 10/123 P, 110, 89 P; 144/205

[56] References Cited
UNITED STATES PATENTS

| | | | |
|---|---|---|---|
| 1,099,215 | 6/1914 | Sullivan................................. | 82/4 R |
| 2,537,916 | 1/1951 | Rosenboom ....................... | 82/4 C X |
| 3,075,412 | 1/1963 | Kushmuk et al.................. | 82/4 C X |
| 3,762,246 | 10/1973 | Becker................................. | 82/4 C |

FOREIGN PATENTS OR APPLICATIONS 11,061  7/1915  Great Britain ......................... 82/67

Primary Examiner—Andrew R. Juhasz
Assistant Examiner—W. R. Briggs
Attorney, Agent, or Firm—William J. Miller

[57] ABSTRACT

A machine for beveling or otherwise finishing the end face of a pipe. The machine includes a supporting assembly positionable within the pipe for securely fastening the machine to the pipe in response to the application of rotary driving power to the machine. The machine further includes a planetary gear train for revolving a cutting tool about an axis coaxial with the axis of the pipe, and a tool driving gear train responsive to the planetary gear train for providing radial advance of the cutting tool along the end face of the pipe simultaneously with the revolution of the cutting tool by the machine.

8 Claims, 10 Drawing Figures

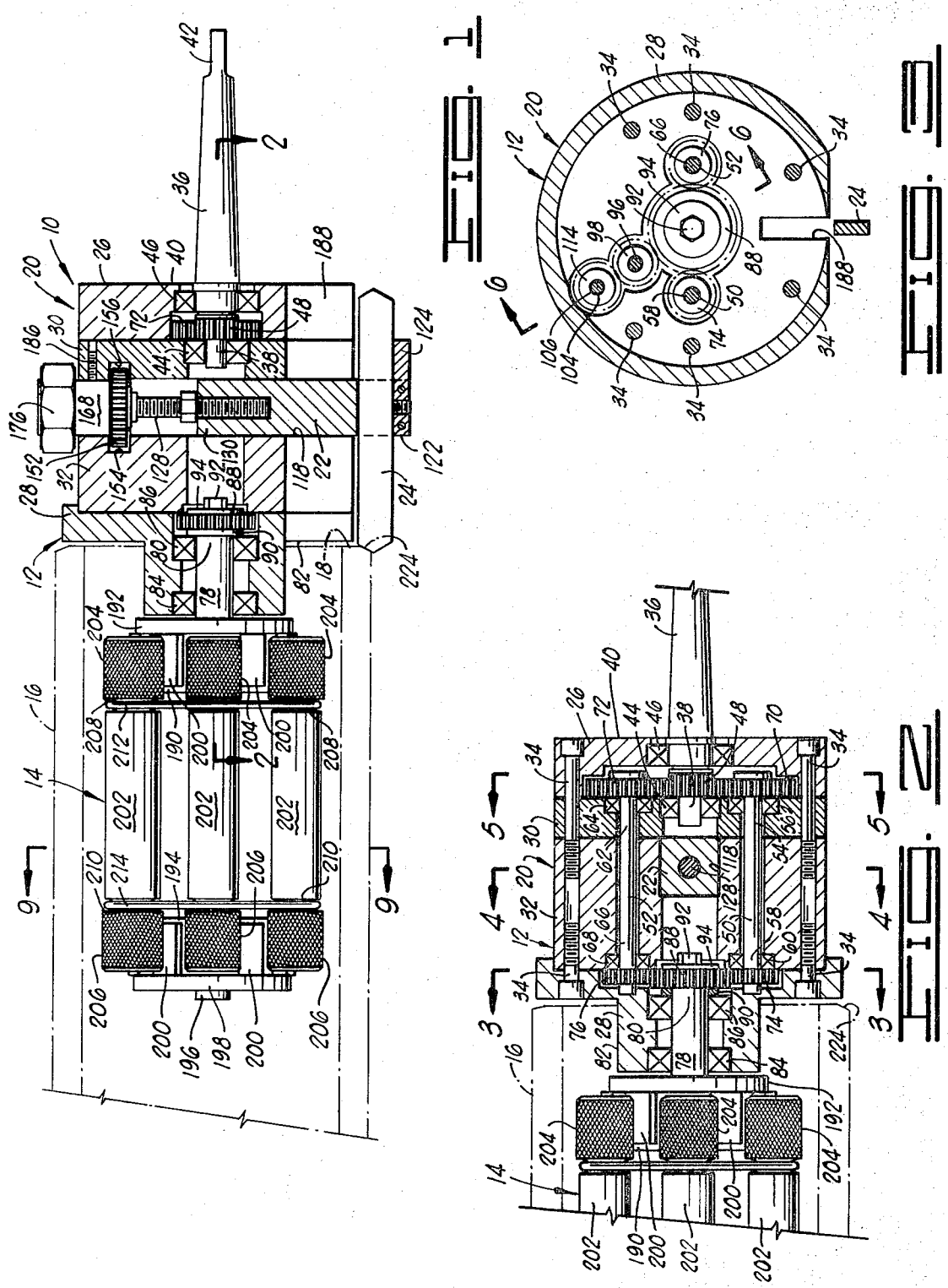

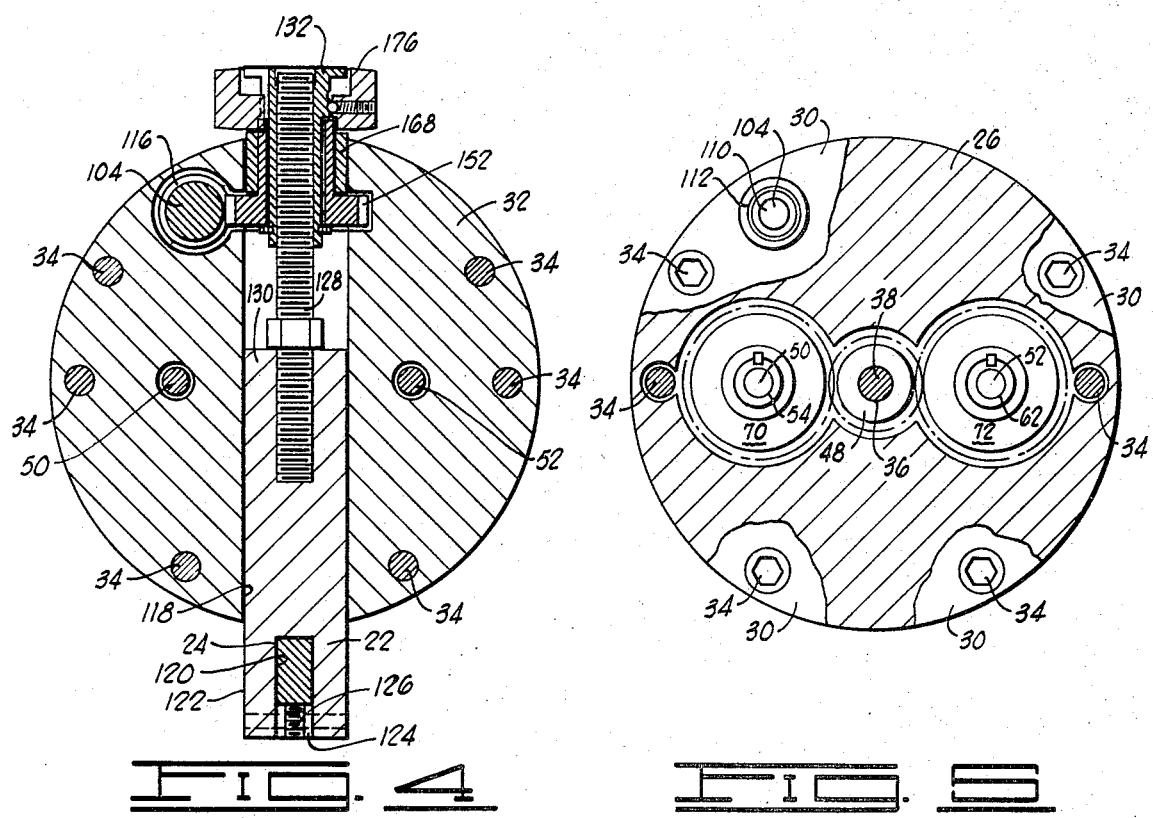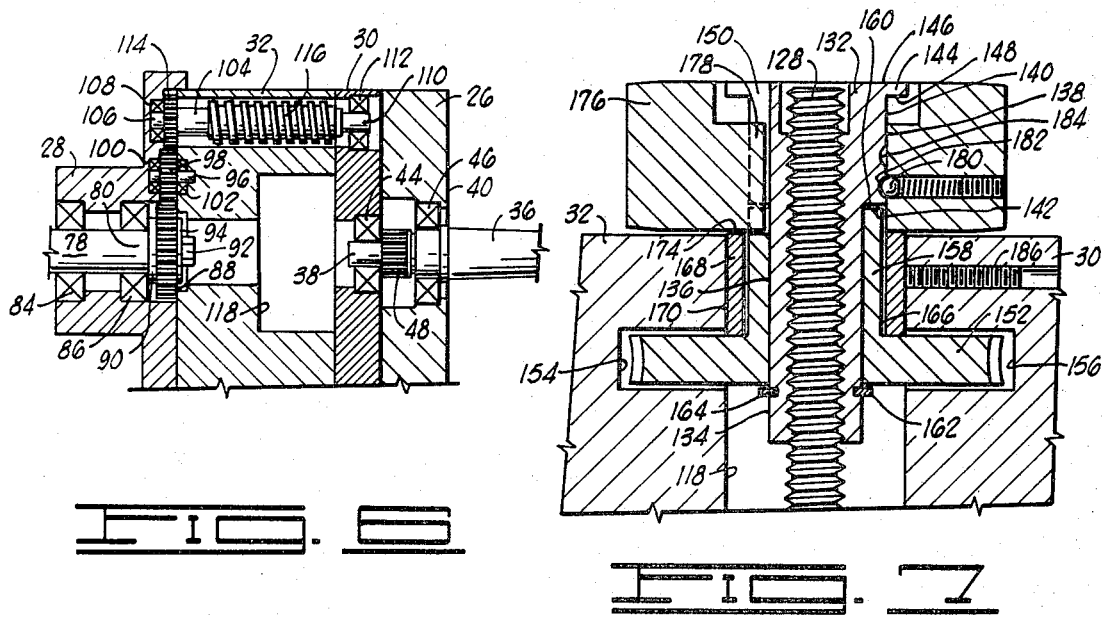

INTERNALLY MOUNTING PIPE BEVELING MACHINE

BACKGROUND OF THE INVENTION

1. Field of the Invention

This invention relates generally to improvements in pipeworking machinery, and more particularly, but not by way of limitation, to a machine for accurately finishing the end face of a pipe in preparation for welding.

2. Description of the Prior Art

The prior art includes a number of machines for preparing the end face of a pipe for welding, which machines are externally mounted on the pipe to be prepared. Some of these machines can be utilized to either cut the pipe off or prepare the end face for welding.

The prior art machines are, however, extremely bulky and require considerable space around the pipe in order to be properly utilized. Such extreme bulk is a serious limitation since most of the applications requiring weld preparation of the end face of a pipe by mechanical means are found in the field in such areas as gas processing plants and refineries where there is a very limited space in which to work.

The internally mounted beveling machine of the present invention is capable of providing the weld preparation to the end face of a pipe in a reasonably confined space, thereby providing a distinct advantage over the prior art machines.

SUMMARY OF THE INVENTION

The present invention contemplates a pipe beveling machine which includes a body having first and second end portions and an input shaft having a first end portion and a second end portion and having the first end portion thereof journaled in the first end portion of the body and having the second end portion thereof extending longitudinally outward from the first end portion of the body. A supporting shaft having a first end portion and a second end portion is journaled at the first end portion thereof in the second end portion of the body and the second end portion thereof extends longitudinally outward from the second end portion of the body in coaxial alignment with the input shaft.

A longitudinal shaft having a first end portion and a second end portion is journaled in the body in parallel alignment with the supporting shaft. A primary input gear is formed on the first end portion of the input shaft and is meshingly engaged with a primary follower gear formed on the first end portion of the longitudinal shaft. A secondary follower gear is formed on the second end portion of the longitudinal shaft and meshingly engages a reaction gear formed on the first end portion of the supporting shaft.

An idler gear is journaled in the body and meshingly engages the reaction gear. A longitudinal drive shaft having a first end portion and a second end portion is journaled in the body in parallel alignment with the supporting shaft and includes a drive gear formed on the first end portion thereof meshingly engaging the idler gear.

A tool post having an inner end portion and an outer end portion is slidably supported by the body for rotational movement therewith and linear translation relative thereto along a line substantially normal to the axis of the supporting shaft. A cutting tool is fixedly secured to the outer end portion of the tool post and a gear train and screw mechanism interconnects the second end portion of the longitudinal drive shaft and the inner end portion of the tool post for imparting linear translation to the tool post relative to the body in response to rotation of the body relative to the supporting shaft.

An object of the present invention is to provide an improved pipe end face beveling machine.

Another object of the present invention is to provide a pipe beveling machine which is securely fastened to the inner periphery of the pipe under preparation during the beveling operation.

Still another object of the present invention is to provide a machine for cutting a bevel and end flat on the end face of a pipe which is true and concentric with respect to the longitudinal axis of the pipe, as well as the inner periphery thereof.

A further object of the present invention is to provide a pipe beveling machine which provides for the automatic radial advance of the cutting tool responsive to the revolution of the cutting tool relative to the end face of the pipe being prepared.

Another object of the present invention is to provide a pipe beveling machine whose mode of attachment to the pipe under preparation and compact physical structure and dimensions permit its operation in confined spaces.

A still further object of the present invention is to provide a pipe beveling machine which is economical in construction, easily and economically maintained, conveniently portable and safely operable.

Other objects and advantages of the invention will be evident from the following detailed description when read in conjunction with the accompanying drawings.

BRIEF DESCRIPTION OF THE DRAWINGS

FIG. 1 is a partial side elevation view of the present invention, a portion thereof shown in cross-section along the longitudinal axis thereof.

FIG. 2 is a cross-sectional view of the present invention taken along line 2—2 of FIG. 1, with a portion thereof shown in plan.

FIG. 3 is a cross-sectional view of the present invention taken along line 3—3 of FIG. 2.

FIG. 4 is a cross-sectional view of the present invention taken along line 4—4 of FIG. 2.

FIG. 5 is a cross-sectional view of the present invention taken along line 5—5 of FIG. 2 with portions of the body assembly broken away.

FIG. 6 is a cross-sectional view taken along line 6—6 of FIG. 3.

FIG. 7 is an enlarged partial cross-sectional view illustrating the worm gear in driving engagement with the tool post.

DESCRIPTION OF THE PREFERRED EMBODIMENT

Figures 8, 9:
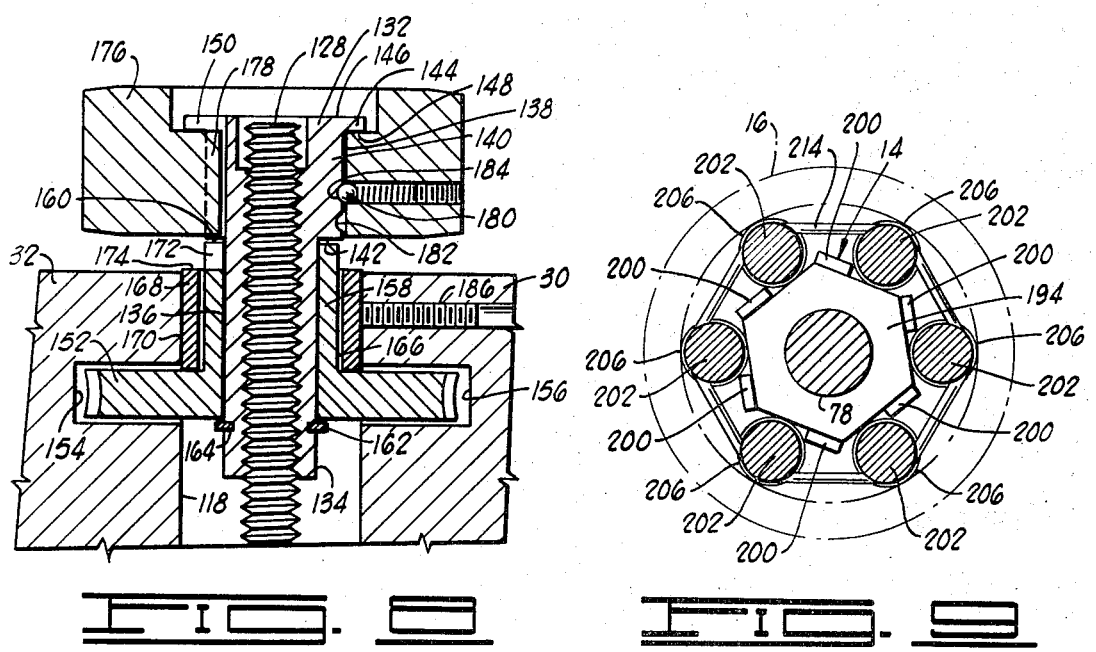
FIG. 8 is an enlarged partial cross-sectional view similar to FIG. 7 illustrating the worm gear disengaged from the tool post.
FIG. 9 is a cross-sectional view of the present invention taken along line 9—9 of FIG. 1.

Referring now to the drawings, the pipe beveling machine of the present invention is generally designated by the reference character 10. The machine 10 comprises a tool drive and carriage assembly 12 and a supporting assembly 14. The machine 10 is shown installed in one end of a pipe 16 having an outer end face 18 which is to be beveled by the machine 10 in preparation for welding.

The tool drive and carriage assembly 12 comprises a body assembly 20, a tool post 22 and a cutting tool 24.

The body assembly 20 comprises an outer end plate 26 an inner end plate 28, an outer tool supporting member 30 and an inner tool supporting member 32. The outer and inner end plates 26 and 28 and the outer tool supporting member 30 are rigidly secured to the inner tool supporting member 32 by means of threaded cap screws 34 which extend through the plates 26 and 28 and the member 30 and are threadedly engaged in threaded holes formed in the inner tool supporting member 32 to form the unitary body assembly 20. The body assembly 20 has a substantially cylindrically shaped outer periphery which is coaxially aligned with the longitudinal axis of the pipe 16.

An input shaft 36 is journaled at the first end portion 38 thereof in the first end portion 40 of the body assembly 20. The second end portion 42 of the input shaft 36 extends longitudinally outwardly from the first end portion 40 of the body assembly 20 and is coaxially aligned with the pipe 16. The second end portion 42 of the input shaft 36 is adapted to be drivingly engaged by a suitable prime mover such as an air motor (not shown) or the like for rotating the shaft 36 to drive the pipe beveling machine.

The first end portion 38 is journaled in the body assembly 20 by means of a pair of suitable bearings 44 and 46 mounted respectively in the outer tool supporting member 30 and the outer end plate 26. A primary input or sun gear 48 is keyed to the first end portion 38 of the input shaft 36 intermediate the bearings 44 and 46.

A pair of longitudinal shafts 50 and 52 are journaled in the body assembly 20 in parallel alignment with the input shaft 36. The first end portion 54 of the shaft 50 is supported by a suitable bearing 56 mounted in the outer tool supporting member 30, and the second end portion 58 of the shaft 50 is supported by a suitable bearing 60 mounted in the inner tool supporting member 32. Similarly, the first end portion 62 of the shaft 52 is supported by a suitable bearing 64 mounted in the outer tool supporting member 30, and the second end portion 66 of the shaft 52 is supported by a suitable bearing 68 mounted in the inner tool supporting member 32.

A primary follower or planet gear 70 is keyed to the first end portion 54 of the shaft 50 and meshingly engages the primary input gear 48. Another primary follower or planet gear 72 is keyed to the first end portion 62 of the shaft 52 and also meshingly engages the primary input gear 48. A secondary follower or planet gear 74 is keyed to the second end portion 58 of the shaft 50, and another secondary follower or planet gear 76 is keyed to the second end portion 66 of the shaft 52.

The supporting assembly 14 includes a longitudinal supporting shaft 78 having the first end portion 80 thereof journaled in the second end portion 82 of the body assembly 20. The first end portion 80 is supported by a pair of suitable bearings 84 and 86 mounted in the inner end plate 28. A reaction or sun gear 88 is keyed to the first end portion 80 of the supporting shaft 78 intermediate the bearing 86 and the inner tool supporting member 32. The reaction gear 88 meshingly engages the secondary follower gears 74 and 76. A suitable annular spacer 90 is disposed intermediate the bearing 86 and the reaction gear 88. The reaction gear 88 is suitably retained on the supporting shaft 78 by means of a threaded cap screw 92 and a washer 94.

The shafts 50 and 52 and the gears 48, 70, 72, 74, 76 and 88 comprise a planetary gear train for rotating the body assembly 20 relative to the supporting shaft 78 in response to rotation of the input shaft 36 relative to the body assembly 20.

A stub shaft 96 is journaled in the body assembly 20 in parallel alignment with the supporting shaft 78. An idler gear 98 is mounted on the stub shaft 96 and is adapted to rotate therewith. The stub shaft 96 is supported by means of a bearing 100 mounted in the inner end plate 28 and a bearing 102 mounted in the inner tool supporting member 32. The idler gear 98 meshingly engages reaction gear 88.

A longitudinal drive shaft 104 is journaled in the body assembly 20 in parallel alignment with the supporting shaft 78. The first end portion 106 of the drive shaft 104 is supported by a suitable bearing 108 mounted in the inner end plate 28. The second end portion 110 of the drive shaft 104 is supported by a suitable bearing 112 mounted in the outer tool supporting member 30. A drive gear 114 is keyed to the first end portion 106 of the drive shaft 104 and meshingly engages the idler gear 98. A worm 116 is keyed to the longitudinal drive shaft 104 adjacent to the second end portion 110 thereof.

The tool post 22 is slidably supported in the body assembly 20 to provide linear translation thereof relative to the body assembly 20 along a line substantially normal to the axis of the supporting shaft 78. The tool post 22 is preferably rectangular in cross-section, as illustrated in FIG. 2, and is slidably received in a rectangularly shaped transverse groove 118 formed in the inner tool supporting member 32. The tool post 22 is retained in the groove 118 by the outer tool supporting member 30. The cutting tool 24 is fixedly secured to the tool post 22 in a longitudinally aligned groove 120 formed in the outer end portion 122 of the tool post 22. The cutting tool 24 is retained in the groove 120 by means of a spacer 124 which is fixedly secured in the groove 120 by dowel pins or the like. A set screw 126 is threadedly engaged in the spacer 124 and bears against the cutting tool 24 to provide rigid securement of the cutting tool 24 to the tool post 22.

A threaded shaft 128 extends from the inner end portion 130 of the tool post 22 along a line substantially normal to the axis of the supporting shaft 78. An internally threaded member 132 is threadedly secured to the threaded shaft 128. The lower end portion 134 of the threaded member 132 has a cylindrically shaped outer peripheral surface 136 formed thereon. A second cylindrically shaped peripheral surface 138 is formed on the upper end portion 140 of the threaded member 132. The peripheral surface 138 is coaxially aligned with the peripheral surface 136 and has a diameter greater than the diameter of the peripheral surface 136. A circumferential shoulder 142 interconnects the peripheral surfaces 136 and 138. A circumferential rib or flange 144 is formed on the upper end 146 of the threaded member 132 and includes a circumferential shoulder 148 which intersects the peripheral suface 138. A groove 150 is formed in the upper end portion 140 of the threaded member 132 in parallel alignment with the axis of the threads formed therein and communicating between the circumferential shoulder 142 and the upper end 146 of the threaded member 132.

A worm gear 152 is journaled on the outer peripheral surface 136 of the threaded member 132. The worm gear 152 is positioned radially relative to the body assembly 20 by means of recesses 154 and 156 formed respectively in the inner tool supporting member 32 and the outer tool supporting member 30. The worm gear 152 includes an upwardly extending annular extension 158 having an annular upper end face 160 formed thereon. The worm gear 152 is retained on the threaded member 132 with the upper end face 160 thereof adjacent to the circumferential shoulder 142 of the threaded member 132 by means of a spring clip 162 disposed in an annular groove 164 formed in the lower end portion 134 of the threaded member 132.

The annular extension 158 includes a cylindrically shaped outer peripheral surface 166. The peripheral surface 166 is journaled in a suitable bearing member 168 having a peripheral surface 170 sized and shaped to be slidably received within the transverse groove 118 formed in the inner tool supporting member 32. A notch 172 having a width substantially equal to the width of the groove 150 is formed in the annular extension 158 and intersects the annular upper end face 160 of the worm gear 152. The upper end face 160 of the worm gear 152 extends a distance above the upper end face 174 of the bearing member 168.

A clutch member 176 is slidably disposed on the cylindrically shaped peripheral surface 138 of the threaded member 132 for axial sliding movement thereon parallel to the axis of the threaded shaft 128. The clutch member 176 is keyed to the threaded member 132 to prevent rotation relative thereto by means of a key 178 extending radially inwardly therefrom into the groove 150.

When the clutch member 176 is in the uppermost, disengaged position, as shown in FIG. 8, the key 178 is not engaged in the notch 172 formed in the worm gear 152. When the clutch member 176 is in the lowermost, engaged position, as shown in FIG. 7, the key 178 is engaged in the notch 172 of the worm gear 152 thereby locking the worm gear 152, clutch member 176 and internally threaded member 132 together as a unit. The clutch member 176 is retained in either the engaged position or the disengaged position by means of the engagement of a spring biased ball 180, carried by the clutch member 176, in engagement with detents 182 and 184, respectively, formed in the upper end portion 140 of the threaded member 132.

The bearing member 168 is suitably secured in the transverse groove 118 by means of a set screw 186 threadedly secured in the outer tool supporting member 30.

The worm 116 meshingly engages the worm gear 152 as shown in FIG. 4.

The body assembly 20 includes a radially aligned longitudinally extending groove 188 formed therein which communicates with the first and second end portions 40 and 82 of the body assembly 20. The groove 188 is sized to permit the cutting tool 124 to be received therein when the tool post 22 is moved radially inwardly a sufficient distance in the body assembly 20.

The supporting assembly 14 comprises the previously mentioned longitudinal supporting shaft 78 which is journaled at its first end portion 80 in the tool drive and carriage assembly 12. A first hexagonally shaped member 190 is fixedly secured to the first end portion 80 of the supporting shaft 78 adjacent to the inner end plate 28 of the tool drive and carriage assembly 12. A circular flange 192 is fixedly secured to the first end portion 80 of the supporting shaft 78 intermediate the first hexagonally shaped member 90 and the inner end plate 28. The diameter of the flange 192 is approximately equal to the major diameter of the first hexagonally shaped member 190 measured across opposite points of the hexagonal outer periphery therof.

A second hexagonally shaped member 194, identical in size and shape to the first hexagonally shaped member 190 is fixedly secured to the second end portion 196 of the longitudinal supporting shaft 78. A circular flange 198 is fixedly secured to the second end portion 196 of the longitudinal supporting shaft 78 adjacent to the second hexagonally shaped member 194. Each planar surface of the hexagonally shaped members 190 and 194 are parallel to and perpendicularly equidistant from the longitudinal axis of the supporting shaft 78. Each planar surface of the first hexagonally shaped member 190 is coplanar with a corresponding planar surface of the second hexagonally shaped member 194. A positioning block 200 is fixedly secured to each planar surface of the first and second hexagonally shaped members 190 and 194.

Six elongated cylindrically shaped members 202 are disposed about the peripheries of the first and second hexagonally shaped members 190 and 194 in parallel alignment with the axis of the supporting shaft 78. The opposite end portions 204 and 206 of each cylindrically shaped member 202 are slightly enlarged in diameter and are in rolling contact with a respective pair of coplanar surfaces formed on the first and second hexagonally shaped members 190 and 194. The end portions 204 and 206 of each cylindrically shaped member 202 are preferably knurled to provide nonslip rolling contact with the planar surfaces of the first and second hexagonally shaped members 190 and 194 and with the inner periphery of the pipe 16. Annular grooves 208 and 210 are formed respectively in each cylindrically shaped member 202 adjacent the end portions 204 and 206 thereof and adjacent to the respective knurled portions formed on the cylindrically shaped members 202.

The cylindrically shaped members 202 are retained in rolling contact with the outer peripheries of the first and second hexagonally shaped members 190 and 194 by means of resilient bands or belts 212 and 214 positioned respectively in the grooves 208 and 210 of the cylindrically shaped members 202. The circular flanges 192 and 198 serve to position the cylindrically shaped members 202 longitudinally on the first and second hexagonally shaped members 190 and 194. The positioning blocks 200 retain the cylindrically shaped members 202 in parallel alignment with the longitudinal supporting shaft 78.

The gears 48, 70, 72, 74, 76, 88, 98 and 114 may be either spur gears or helical gears depending on various design considerations. Helical gears may be deemed preferable where high gear loads are anticipated in the use of the pipe beveling machine. The preferred gear ratio is obtained when the primary input or sun gear 48 includes a lesser number of gear teeth than the primary follower or planet gears 70 and 72, and when the secondary follower or planet gears 74 and 76 each include a lesser number of teeth than the reaction of sun gear 88. The preferred gear ratio causes the body assembly 20 to rotate relative to the supporting shaft 78 at an angular velocity less than the angular velocity of the rotation of the input shaft 36 relative to the body assembly 20.

The bearings employed in the pipe beveling machine 10 may be bushings, ball bearings or roller bearings depending on various design considerations.

OPERATION OF THE PREFERRED EMBODIMENT

Figure 10:
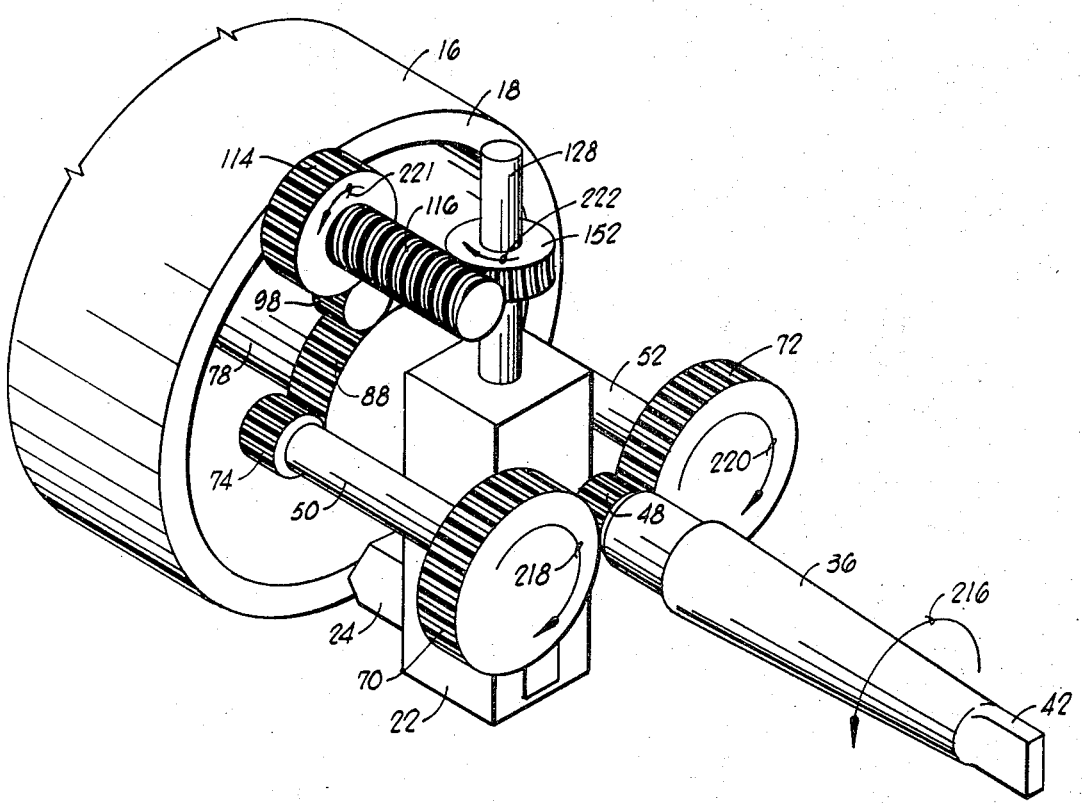
FIG. 10 is a schematic diagram of the present invention with the body assembly removed for more clearly illustrating the operation thereof.

In describing the operation of the pipe beveling machine 10, it is believed that the schematic diagram illustrated in FIG. 10 will facilitate understanding. FIG. 10 illustrates the gear train of the pipe beveling machine 10 in schematic form with the body assembly 20 removed to expose the gearing and the tool post 22 with the cutting tool 24 attached thereto.

In operation, the pipe beveling machine 10 is positioned with the supporting assembly 14 inserted in the end of the pipe 16 having an end face 18 which is to be beveled in preparation for welding. The machine 10 is positioned such that the cutting tool 24 is adjacent to the end face 18 as illustrated in FIG. 1. The tool post 22 may be adjusted radially relative to the body assembly 20 by raising the clutch member 176 to a position disengaging the threaded member 132 from the worm gear 152. The clutch member 176 and the threaded member 132 may then be rotated to adjust the radial position of the tool post 22 relative to the body assembly 20 until the cutting tool 24 is positioned adjacent to the end face 18 of pipe 16. The clutch member 176 is then lowered to engage the worm gear 152 with the internally threaded member 132.

A suitable prime mover such as air motor (not shown) is then engaged with the second end portion 42 of the input shaft 36. The shaft 36 is turned by the prime mover in a counterclockwise direction as indicated by the arrow 216 which causes the longitudinal shafts 50 and 52 to be rotated by the sun gear 48 and planet gears 70 and 72 in a clockwise direction as indicated by the arrows 218 and 220. The clockwise rotation of the shafts 50 and 52 causes the body assembly 20 to be rotated in a clockwise direction relative to the reaction or sun gear 88 and the longitudinal supporting shaft 78.

This action applies a counterclockwise torque to the longitudinal supporting shaft 78 which in turn applies a counterclockwise torque to the supporting assembly 14 within the pipe 16. This counterclockwise torque is resisted by the wedging action of the cylindrically shaped members 202 which engage the inner periphery of the pipe 16 and tend to roll in a clockwise direction relative to the first and second hexagonally shaped members 190 and 194 to securely fasten the pipe beveling machine 10 to the inner periphery of the pipe 16.

As the body assembly 20 continues to rotate in a clockwise direction relative to the reaction gear 88 and the supporting shaft 78, the idler gear 98 is driven in a clockwise direction which in turn drives the drive gear 114 in a counterclockwise direction, as viewed in FIG. 10. The counterclockwise rotation of drive gear 114 directly rotates the drive shaft 104 and the worm 116 keyed thereto in a counterclockwise direction as indicated by the arrow 221, thereby rotating the worm gear 152 in the direction indicated by the arrow 222. As illustrated in FIG. 7, the rotation of the worm gear 152 in the direction indicated by the arrow 222 causes the internally threaded member 132, locked to the worm gear 152, to draw the threaded shaft 128 upwardly relative to the worm gear 152. Such movement of the threaded shaft 128 relative to the worm gear 152 causes the tool post 22 and the cutting tool 24 secured thereto to be moved radially inwardly relative to the body assembly 20 thereby causing the cutting tool 24 to advance radially inwardly along the end face 18 of the pipe 16 until a suitable beveled surface 224 is formed on the end face 18.

When the beveled surface 224 is completed to the satisfaction of the operator, input power to the pipe beveling machine 10 is shut off and the machine 10 is freely removed from the pipe 16.

As is clearly shown in FIG. 1, the angle of the beveled surface 224 is controlled by the angle of the cutting edge of the cutting tool 24 which engages the end face 18 of the pipe 16. It will be readily apparent that, by utilizing different cutting tools with various shapes of cutting edges, the machine 10 may be employed to finish the end face 18 of the pipe 16 with an end flat or a combination of an end flat and a beveled surface. The particular configuration of the finished end face of a pipe being prepared by application of the machine 10 is essentially a function of the design of the cutting edge of the cutting tool.

Changes may be made in the combination and arrangement of parts or elements as heretofor set forth in the specification and shown in the drawings without departing from the spirit and scope of the invention as defined in the following claims.

What is claimed is:

1. A pipe beveling machine comprising:
    a body having first and second end portions;
    an input shaft having a first end portion and a second end portion and having the first end portion thereof journaled in the first end portion of said body and having the second end portion thereof extending outwardly from the first end portion of said body;

a supporting shaft having a first end portion and a second end portion and having the first end portion thereof journaled in the second end portion of said body and having the second end portion thereof extending outwardly from the second end portion of said body in coaxial alignment with said input shaft;

securing means operatively engaging said supporting shaft for rigidly securing said supporting shaft to the inner periphery of a pipe to be beveled in substantial coaxial alignment with the longitudinal axis of the pipe;
    planetary gear train means journaled in said body and coupling said input shaft and said supporting shaft for rotating said body relative to said supporting shaft in response to rotation of said input shaft relative to said body;
    a tool post having an inner end portion and an outer end portion and slidably supported in said body for rotational movement therewith and linear translation relative thereto along a line substantially normal to the axis of said supporting shaft;

a cutting tool fixedly secured to the outer end portion of said tool post; and means coupling said supporting shaft and said tool post for imparting linear translation to said tool post relative to said body in response to rotation of said body relative to said supporting shaft.

2. The pipe beveling machine as defined in claim 1 wherein said planetary gear train means is characterized further as rotating said body relative to said supporting shaft at an angular velocity less than the angular velocity of the rotation of said input shaft relative to said body.

3. A pipe beveling machine comprising:

a body having first and second end portions;

an input shaft having a first end portion and a second end portion and having the first end portion thereof journaled in the first end portion of said body and having the second end portion thereof extending longitudinally outwardly from the first end portion of said body;

a supporting shaft having a first end portion and a second end portion and having the first end portion thereof journaled in the second end portion of said body and having the second end portion thereof extending longitudinally outwardly from the second end portion of said body in coaxial alignment with said input shaft;

securing means operatively engaging said supporting shaft for rigidly securing said supporting shaft to the inner periphery of a pipe to be beveled in substantial coaxial alignment with the longitudinal axis of the pipe;

a longitudinal shaft having a first end portion and a second end portion and journaled in said body in parallel alignment with said supporting shaft;

a primary input gear formed on the first end portion of said input shaft;

a primary follower gear formed on the first end portion of said longitudinal shaft and meshingly engaging said primary input gear;

a secondary follower gear formed on the second end portion of said longitudinal shaft;

a reaction gear formed on the first end portion of said supporting shaft and meshingly engaging said secondary follower gear;

an idler gear journaled in said body and meshingly engaging said reaction gear;

a longitudinal drive shaft having a first end portion and a second end portion and journaled in said body in parallel alignment with said supporting shaft;

a drive gear formed on the first end portion of said longitudinal drive shaft and meshingly engaging said idler gear;

a tool post having an inner end portion and an outer end portion and slidably supported in said body for rotation therewith and linear translation relative thereto along a line substantially normal to the axis of said supporting shaft;

a cutting tool fixedly secured to the outer end portion of said tool post; and means interconnecting the second end portion of said longitudinal drive shaft and the inner end portion of said tool post for imparting linear translation to said tool post relative to said body in response to rotation of said body relative to said supporting shaft.

4. The pipe beveling machine as defined in claim 3 characterized further to include:

at least one additional longitudinal shaft having a first end portion and a second end portion and journaled in said body in parallel alignment with said input shaft and said supporting shaft;

a primary follower gear formed on the first end portion of each additional longitudinal shaft and meshingly engaging said primary input gear; and a secondary follower gear formed on the second end portion of each additional longitudinal shaft and meshingly engaging said reaction gear.

5. The pipe beveling machine as defined in claim 3 wherein said means interconnecting said longitudinal drive shaft and said tool post is characterized further to include:

a threaded shaft extending from the inner end portion of said tool post along a line substantially normal to the axis of said supporting shaft.

a threaded member journaled in said body coaxial with said threaded shaft and threadedly engaging said threaded shaft;

a worm gear journaled in said body coaxial with said threaded shaft;

means coupling said worm gear and said threaded member for providing rigid engagement therebetween; and a worm formed on the second end portion of said drive shaft and meshingly engaging said worm gear.

6. The pipe beveling machine as defined in claim 3 wherein:

said primary input gear includes a lesser number of teeth than said primary follower gear; and said secondary follower gear includes a lesser number of teeth than said reaction gear.

7. The pipe beveling machine as defined in claim 3 wherein said tool post is characterized further as being non-circular in cross-section and being slidably disposed in a non-circular channel formed in said body and conforming to the cross-sectional shape of said tool post.

8. The pipe beveling machine as defined in claim 3 wherein said securing means is characterized further to include:

a first polygonal member formed on said supporting shaft adjacent to said body, said polygonal member including a plurality of planar surfaces formed on periphery thereof with each planar surface being parallel to and perpendicularly equidistant from the longitudinal axis of said supporting shaft;

a second polygonal member formed on said supporting shaft distal from said body, said second polygonal member including the same number of planar surfaces formed on the periphery thereof as said first polygonal member, with each planar surface thereof being parallel to and perpendicularly equidistant from the longitudinal axis of said supporting shaft and coplanar with a corresponding planar surface on said first polygonal member;

a plurality of elongated cylindrically shaped members disposed about the peripheries of said first and second polygonal members and extending therebetween in parallel alignment with the axis of said supporting shaft, each cylindrically shaped member being in rolling contact with a respective pair of coplanar surfaces of said first and second polygonal members; and resilient means for retaining said plurality of cylindrically shaped members in rolling contact with the respective coplanar surfaces of said first and second polygonal members.

* * * * *